3,726,864
NOVEL 11β-CHLORO - 19 - NORPREGN-4-ENE-3,20
DIONES AND THE 3,5-DIENOL ETHERS AND
ESTERS THEREOF
Gordon Hanley Phillipps, Wembley, and Leslie Stephenson and Christopher Earle Newall, London, England, assignors to Glaxo Laboratories Limited
No Drawing. Filed July 20, 1970, Ser. No. 56,710
Int. Cl. C07c 173/00
U.S. Cl. 260—239.55     17 Claims

ABSTRACT OF THE DISCLOSURE

New 11β-chloro-19-norpregn-4-ene-3,20-diones and 3,5-dienol ethers and esters thereof show progesterone-like activity superior to that of previously known and closely related substances. Methods for their preparation include inter alia the chlorination of corresponding 11α-hydroxy steroids and the introduction of desired substituents into already 11β-chlorinated steroids. The compounds are of use in human and veterinary medicine as contraceptives and also in clinical conditions, e.g. dysmenorrhoea.

---

This invention relates to novel chlorine-substituted steroids and their preparation.

We have previously described 9α-unsubstituted 11β-chloro-19-nor steroids as possessing valuable hormonal activity. We have now found that particular steroids of this class, hitherto undisclosed, possess especially valuable progesterone-like activity, more especially progestational and anti-oestrogenic activity as well as anti-androgenic activity.

According to the present invention therefore we provide steroids of the general formula

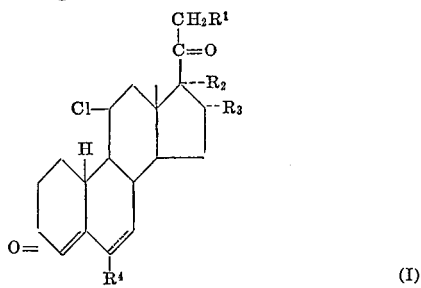

(in which a double bond in the 6,7-position may be present or absent and in which $R^1$ represents a hydrogen or halogen atom;

$R^2$ represents a hydrogen atom, a hydroxy group or an alkoxy or acyloxy group having 1 to 6 carbon atoms;

$R^3$ represents a hydrogen or halogen atom or an alkylthio group with 1 to 6 carbon atoms, or $R^2$ and $R^3$ together represent an alkylidenedioxy or aralkylidenedioxy group;

$R^4$ represents a hydrogen, fluorine or chlorine atom or a methyl group provided that $R^1$ does not represent a hydrogen atom unless $R^2$ represents a formyloxy or alkoxy group or unless $R^3$ represents a halogen atom or an alkylthio group or unless $R^2$ and $R^3$ represent an alkylidenedioxy or aralkylidenedioxy group or unless $R^4$ is a fluorine atom or a methyl group) and 3,5-dienol ethers and esters thereof.

Where $R^1$ represents a halogen atom this may be a fluorine, chlorine, bromine or iodine atom, preferably a fluorine or chlorine atom. Where $R^2$ represents an acyloxy group this may be for example, a formyloxy, acetoxy, propionyloxy, butyryloxy, valeryloxy or caproyloxy group and where $R^2$ represents an alkoxy group this may be, for example, a methoxy, ethoxy, propoxy, butoxy, pentoxy or hexoxy group.

When $R^3$ represents a halogen atom this may be a fluorine, chlorine, bromine or iodine atom, preferably a chlorine atom. When $R^3$ represents an alkylthio group this may be, for example, a methyl-, ethyl-, propyl-, butyl-, pentyl- or hexylthio group.

When $R^2$ and $R^3$ together represent an alkylidenedioxy group this may be, for example, an isopropylidenedioxy or isobutylidenedioxy group and when $R^2$ and $R^3$ together represent an aralkylidenedioxy group, this may be for example, a 1-phenylethylidenedioxy or diphenylmethylidenedioxy group.

Where $R^4$ represents a fluorine or chlorine atom or a methyl group, a double bond is preferably present in the 6,7-position.

3,5-dienol ethers include, for example, the dienol methyl and ethyl ethers, dienol esters include, for example, acetic, propionic, benzoic, valeric and hexahydrobenzoic esters.

In general, the compounds according to the invention show progesterone-like activity superior to that of previously known and closely related substances, and especially antioestrogenic activity as determined by subcutaneous administration to mice simultaneously with oestradiol and measurement of uterine carbonic anhydrase as compared with oestradiol alone over 5 days. Antioestrogenic activities as high as 1000 times that of progesterone have been observed. Such high activity renders the compounds especially useful as a continuous low-dose contraceptive formulation containing progestin only.

Particularly useful compounds according to the invention by virtue of their high progesterone-like activity include:

6,11β-dichloro-17α-formyloxy-19-norpregna-4,6-diene-3,20-dione,
11β,16α-dichloro-19-norpregn-4-ene-3,20-dione,
11β-chloro-16α,17α-isopropylidenedioxy-19-norpregn-4-ene-3,20-dione, as compounds of especially high activity, as well as 11β-chloro-17α-formyloxy-19-norpregn-4-ene-3,20-dione,
17α-acetoxy-11β-chloro-6-methyl-19-norpregna-4,6-diene-3,20-dione,
17α-acetoxy-11β-chloro-21-fluoro-19-norpregn-4-ene-3,20-dione,
6,11β,16α-trichloro-19-norpregna-4,6-diene-3,20-dione and
17α-acetoxy-11β,21-dichloro-19-norpregn-4-ene-3,20-dione.

Other compounds which are of particular interest in relation to the present invention include:

9α-unsubstituted-6β-halo-11β-chloro-19-norpregn-5(10)-ene-3,20-diones and dienol ethers and esters thereof,
9α-unsubstituted-6β-halo-11β-chloro-19-norpregnan-5α-ol-3,20-diones,
9α-unsubstituted-6β-halo-11β-chloro-19-norpregnane-3β,5α-diol-20-ones,
9α-unsubstituted-11β-chloro-5α,6α-epoxy-19-norpregnan-3β-ol-20-ones,
9α-unsubstituted-11β-chloro-19-norpregn-5-ene-3β-ol-20-ones,
3 ethers and 3 esters of 9α-unsubstituted-11β-chloro-6-dimethylaminomethyl-19-norpregna-3,5-dien-3-ol-20-one borane adducts and
9α-unsubstituted-11β-chloro-19-norpregn-4-ene-16α,17α-diol-3,20-diones.

These compounds have shown particular usefulness as intermediates in the preparation of the compounds of Formula I.

The new steroids according to the invention may be prepared in any convenient way. According to a further feature of the invention we provide a process for the preparation of steroids of the general formula

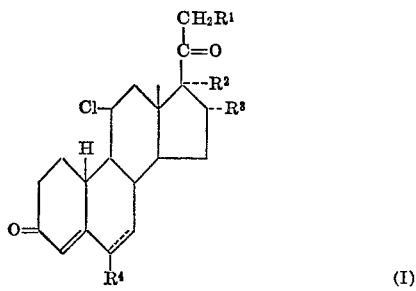

(in which a double bond in the 6,7-position may be present or absent and in which $R^1$ represents a hydrogen or halogen atom;

$R^2$ represents a hydrogen atom, a hydroxy group or an alkoxy or acyloxy group having 1 to 6 carbon atoms;

$R^3$ represents a hydrogen or halogen atom or an alkylthio group with 1 to 6 carbon atoms, or $R^2$ and $R^3$ together represent an alkylidenedioxy or aralkylidenedioxy group;

$R^4$ represents a hydrogen, fluorine or chlorine atom or a methyl group provided that $R^1$ does not represent a hydrogen atom unless $R^2$ represents a formyloxy or alkoxy group or unless $R^3$ represents a halogen atom or an alkylthio group or unless $R^2$ and $R^3$ represent an alkylidenedioxy or aralkylidenedioxy group or unless $R^4$ is a fluorine atom or a methyl group) and 3,5-dienol ethers and esters thereof in which a steroid of the general formula

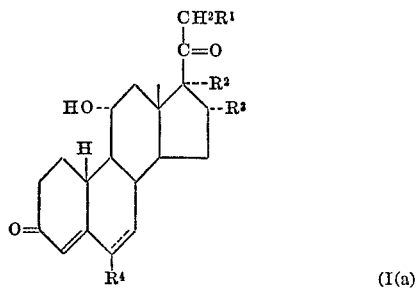

(in which a double bond in the 6,7-position may be present or absent and in which $R^1$ represents a hydrogen or halogen atom;

$R^2$ represents a hydrogen atom, a hydroxy group or an alkoxy or acyloxy group having 1 to 6 carbon atoms; $R^3$ represents a hydrogen or halogen atom or a hydroxy group or an alkylthio group with 1 to 6 carbon atoms or $R^2$ and $R^3$ together represent an alkylidenedioxy or aralkylidenedioxy group or a carbon-carbon bond; and $R^4$ represents a hydrogen, fluorine or chlorine atom or a methyl group) or a 3,5-dienol ether or ester thereof is reacted with a reagent of the general formula

where $R^1$ and $R^2$, which may be the same or different, are alkyl groups having 1–8 carbon atoms or aralkyl or aryl groups or, together with the nitrogen atom to which they are attached, comprise a heterocyclic radical which may, if desired, contain further hetero-atoms, $R^3$ is a chlorine or fluorine atom, $R^4$ is a chlorine or fluorine atom and $R^5$ is hydrogen or $R^4$ and $R^5$ together represent a carbon-acrbon bond; $R^6$ is a chlorine or fluorine atom and $R^7$ is a chlorine or fluorine atom or a trifluoromethyl group, the reaction being effected in the presence of chloride ions when neither $R^3$ nor $R^4$ is chlorine; or with a triarylphosphone or triarylphosphite and chlorine or a chloroalkane; or with an arylsulphonylating or alkylsulphonylating reagent followed by reaction of the corresponding 11α-arylsulphonate or 11α-alkylsulphonate so formed with a source of chloride ions; or in an inert solvent with a source of positive chlorine, an anhydrous form of sulphur dioxide being present or added subsequently; followed, where a compound of Formula I is not initially produced, by reaction of a 16,17-dehydro steroid with a hydrogen halide to introduce a 16α-halo substituent, with an alkanethiol to introduce a 16α-alkylthio substituent or with a vicinal-dihydroxylating agent followed by reaction with a ketone to introduce a 16α, 17α-alkylidenedioxy or -aralkylidenedioxy group; or by reaction of a 17β-acetyl-17α-hydroxy steroid with an acylating or alkylating agent; or by introduction of a fluorine atom or a methyl group into the 6-position; or by reaction with a halogenating agent to introduce a 21-halogen atom.

The source of chloride ions in the variation of the reaction with the compound of Formula II in which neither $R^3$ nor $R^4$ is chlorine is preferably a salt soluble in organic solvents but the cationic portion should be inert to the reagent of Formula II for example, the cation of a tetrtiary or quaternary nitrogen base, e.g. triethylamine, trimethylamine, pyridine, collidine, tetrabutyl ammonium hydroxide etc. In general, however the preferred source of chloride ions is lithium chloride.

The reagents of Formula II in which neither $R^3$ nor $R^4$ is chlorine include:

N-(2-chloro-1,1,2-trifluoroethyl)diethylamine,
N-(1,1,2,2-tetrafluoroethyl)diethylamine,
N-(2-chloro-1,1,2-trifluoroethyl)dimethylamine,
N-(2-chloro-1,1,2-trifluoroethyl)dipropylamine,
N-(2-chloro-1,1,2-trifluroethyl)diisobutylamine,
N-(2-choro-1,1,2-trifluoroethyl)dioctylamine,
N-(2-chloro-1,1,2-trifluoroethyl)methylethylamine,
N-(2,2-dichloro-1,1-difluoroethyl)diethylamine,
N-(1,1,2,3,3,3-hexafluoropropyl)diethylamine and
N-(1,1,2,2-tetrafluoroethyl) diisopropylamine.

The reagent of choice is N-(2-chloro-1,1,2-trifluoroethyl)-diethylamine.

Reagents of Formula II in which one or both of $R^3$ and $R^4$ are chlorine include, in particular, N,N-diethyltrichlorovinylamine.

The reaction with the compound of Formula II is preferably effected in an inert solvent, that is any solvent which does not react with there agents, for example aromatic and aliphatic hydrocrabons, halogenated hydrocarbons, esters, ketones, nitriles, ethers and tertiary alcohols. Examples of such solvents are benzene, toluene, chlorobenzene, methylene chloride, pentane, hexane, cyclohexane, ethyl acetate, butyl acetate, acetonitrile, acetone, methyl ethyl ketone, tetrahydrofuran, diethyl ether, diethylene glycol dimethyl ether, t-butyl alcohol, t-amyl alcohol, and the like. Since the starting materials are frequently only slightly soluble in non-polar solvents, a polar solvent such as tetrahydrofuran is preferred.

Unless further chlorine substituents are required, reactive hydroxyl groups initially present in the steroid should be protected, for example by esterification, etherification etc.

The 11β-chloro-19-nor-steroids can be prepared, as disclosed above by reacting the corresponding 11α-aryl-sulphonate or 11α-alkylsulphonate with a source of chloride ions, for example a chloride of an alkali metal e.g. lithium chloride, or a hydrochloride of a tertiary organic base such as triethylamine or a chloride of a quanternary organic base such as tetrabutyl ammonium chloride, advantageously in an inert polar solvent such as tetrahydrofuran. The above 11α-sulphonates may be prepared by reacting the corresponding 11α-hydroxy compound with an alkyl- or aryl-sulphonyl halide.

The 11β-chloro-19-nor-steroids may also be prepared, as further disclosed, by reaction of a 9α-unsubstituted-11α-hydroxy-19-nor-steroid with a triarylphosphine or-phosphite and chlorine or a chloroalkane, for example, triphenylphosphine in carbon tetrachloride.

The 11-β-chloro-19 nor steroids may additionally be prepared by reaction of a 9α-unsubstituted 11α-hydroxy-19-norsteroid in an inert solvent with a source of positive chlorine such as elemental chlorine; a tertiary alkyl hypochlorite or a cyclic or acyclic N-chloroamide, imide or hydantoin, for example, N-chloroacetamide, N-chloro- or N,N-dichlorodimethylhydantoin or, for preference, N-chlorosuccinimide; an anhydrous form of sulphur dioxide, such as liquid or gaseous sulphur dioxide or an alkali metal hyposulphite, being present or added subsequently. The inert solvent is preferably an aromatic or saturated ether, a substituted amide or a tertiary amine, and is preferably effected in the absence of light, under anhydrous conditions and at a low or moderate temperature, e.g. from —40° to 50° C.

Introduction of specific groups into the molecule, either before or after introduction of the 11β-chlorine atom may be effected by any of the following processes.

Compounds of the Formula I in which $R^3$ represents a halogen atom may be prepared by reacting the corresponding $\Delta^{16}$-steroid with a hydrohalic acid advantageously in an inert solvent, for example acyclic ether, e.g. dioxan or tetrahydrofuran, or a chlorinated hydrocarbon, e.g. methylene chloride, ethanol-free chloroform or carbon tetrachloride. The reaction is conveniently effected at a temperature between —25° and +30° C. Thus, for example 6,11β,16α-trichloro-19-norpregna-4,6-diene-3,20-dione may be prepared from 6,11β-dichloro-19-norpregna-4,6-16-triene-3,20-dione by reaction with hydrogen chloride in dioxan.

The alkylidenedioxy or aralkylidenedioxy compounds of Formula I may be prepared by reacting the corresponding 16α,17α-diols with an appropriate ketone under acid conditions, e.g. using mineral acids such as hydrochloric or perchloric acid. The 16α,17α-diols may be prepared by subjecting the corresponding 16-ene to vicinal dihydroxylation by oxidation with such reagents as permanganate, osmium tetroxide etc. (Cooley, J. 1955, 4373). The oxidation with permanganate is preferably effected at a low temperature e.g. —10° to +10° C., in a wet water-miscible solvent, e.g. a ketone such as acetone, advantageously in the presence of a weak acid such as acetic acid.

Steroids of the Formula I in which $R^3$ represents an alkylthio group may be prepared by reacting the corresponding $\Delta^{16}$-steroid with an alkanethiol, e.g. methanethiol, in the presence of an acid, for example a mineral acid, e.g. hydrochloric acid. The reaction is preferably effected in a polar solvent, such as glacial acetic acid, and at a temperature between —25 and +30° C.

Steroids of the Formula I in which $R^1$ represents a halogen atom may be prepared by direct halogenation of the corresponding 17-acetyl steroids. Iodination may conveniently be effected by reaction with iodine in the presence of calcium oxide and hydroxide and a solvent such as methanol/methylene chloride, preferably with the addition of a free-radical initiator, for example azobisisobutyronitrile. Steroids in which $R^1$ represents chlorine, bromine or fluorine may then be obtained from the 21-iodo steroid by reaction with a source of chloride, bromide or fluoride ions, e.g. a metal chloride, bromide or fluoride, for example lithium chloride, lithium bromide or silver fluoride. The reaction is preferably effected in an ionising medium, for example a water-miscible solvent for the steroid; wet acetonitrile is preferred when using silver fluoride; dry acetone is preferred when using lithium chloride or bromide.

Steroids of the Formula I in which $R^2$ represents an acyloxy group may be prepared from the corresponding 17α-hydroxy steroids by acylation for example by reaction with an acyl halide or anhydride preferably in the presence of an acid catalyst e.g. p-toluene sulphonic acid or perchloric acid conveniently using an inert solvent such as methylene chloride or benzene.

When an acyl anhydride is used, dienol esters may be formed but partial hydrolysis yields the desired 17-monoester.

A method of choice for preparing 17α-acyloxy steroids is reaction of the 17α-ol with trifluoroacetic anhydride and the appropriate carboxylic acid e.g. glacial acetic acid. This acylation is preferably effected at an elevated temperature, e.g. about 80° C.

17α-acylation may also be effected using antimony pentachloride and the appropriate acyl chloride under nonhydroxylic conditions e.g. using nitromethane/chloroform as solvent.

The 17α-formyloxy steroids may conveniently be prepared by reaction of the 17α-ol with concentrated formic acid in the presence of phosphorus pentoxide. The reaction may be effected in an excess of formic acid as solvent and at a temperature between 0° C. and ambient temperature.

Steroids of the Formula I in which $R^2$ represents an alkoxy group are advantageously prepared by reaction of the corresponding 17α-ol with silver oxide and an alkyl halide, preferably the iodide, conveniently in a substituted amide, imide or hydantoin solvent such as dimethyl formamide or dimethyl acetamide. The silver oxide should be freshly prepared.

Steroids of the Formula I in which $R^4$ represents a halogen atom and a 6,7-double bond is present may be prepared by reaction of the corresponding 6β-halo-5(10)en-3-one and /or 6β-halo-4-en-3-one under acid conditions e.g. in the presence of p-toluenesulphonic, sulphosalicylic or, preferably, sulphuric acid, with an enol etherifying or enol esterifying agent, e.g. triethyl orthoformate or an acyl anhydride or isopropenyl acylate and then with a dehydrogenating reagent such as manganese dioxide, chloranil or 2,3-dichloro-5,6-dicyano benzoquinone (DDQ). The 6β-halo-5(10)-en-3-one can in turn be prepared usually in admixture with the 6β-halo-4-en-3-one from the corresponding 5-ol-3-one by acid catalysed dehydration, for example by reaction with dry hydrogen chloride for example in glacial acetic acid or a chlorinated hydro-carbon solvent. The 5α-ol-3-one may be obtained by oxidation of the corresponding 3β,5α-diol using a reagent capable of oxidising a secondary hydroxyl group to an oxo group for example chromic acid; the diol may be obtained from the corresponding 5α,6α-epoxy-3β-ol by opening the epoxide ring with hydrogen chloride or fluoride or boron trifluoride (etherate) in a hydrocarbon and/or ether solvent e.g. tetrahydrofuran, dioxan, diethyl ether, cyclohexane, toluene, benzene etc. The epoxide may in turn, be obtained by epoxidation of the corresponding 5-en-3-ol for example using a per acid, e.g. m-chloroperbenzoic, perbenzoic, perphthalic acid etc. in a chlorinated hydrocarbon and/or ether solvent e.g. methylene chloride, chloroform or diethyl ether. The 5-en-3-ol may be obtained from the 3-ester of the corresponding 3,5-dien-3-ol by reduction, for example with a borohydride reducing agent such as sodium borohydride, conveniently in an ether/alcohol solvent which may contain water, e.g. methanol, ethanol, t-butanol etc. with tetrahydrofuran, dioxan or glycol ethers.

Other 6β-chloro-3-oxo-$\Delta^4$-steroids may be obtained by reaction of a 3-acyloxy or 3-alkoxy-$\Delta^{3,5}$-11β-chloro-19-nor-steroid with a chlorinating agent such as molecular chlorine preferably in the presence of a carboxylic acid such as acetic, propionic or pivalic acid and a tertiary base such as trimethylamine, triethylamine or pyridine, or with an N-chloro-amide or -imide e.g. N-chlorosuccinimide, or N-chloroacetamide, preferably in the presence of an inorganic or organic base, e.g. an alkali metal acetate such as sodium or potassium acetate or a tertiary amine such as triethylamine, trimethylamine or pyridine in the presence of a carboxylic acid such as acetic, propionic or pivalic acid. The 3-acyloxy group may, for example, be a 3-benzoyloxy or 3-acetoxy group, and the 3-alkoxy group may, for example, be a methoxy or ethoxy group.

3-oxo-$\Delta^{4,6}$-steroids according to the invention can be prepared by reaction of a corresponding 3-acyloxy or 3-alkoxy-$\Delta^{3,5}$-steroid with a reagent capable of converting an enol ether or ester into a conjugated ketone, for example chloranil or manganese dioxide.

Steroids of the Formula I in which $R^4$ represents a methyl group may be prepared by hydrogenation or preferably transfer hydrogenation of the 3-ether of the corresponding 3 - hydroxy - 6 - dimethylaminoethyl-3,5-diene borane adduct e.g. using a palladium catalyst in the presence of a cyclic olefin such as cyclohexane, advantageously at a pH in the range 4–7 and dehydrogenation, for example with manganese dioxide, chloranil or DDQ. The 6-dimethylaminomethyl steroid borane adduct may be derived from the reaction of a 3-ether of the corresponding 3,5-dien-3-ol with a Vilsmeier reagent followed by treatment with a reducing agent of the borohydride type. The Vilsmeier reagent may be formed by reaction in the absence of water between an N-formylated secondary amine and an acid halide selected from those acid halides which readily undergo nucleophilic displacement of a halide ion on treatment with the N-formaylated secondary amine.

The N-formylated secondary amine may be, for example dimethylformamide, diethylformamide, methylformamide, methylphenylformamide, ethylphenylformamide, N-formylpiperidine or N-formymorpholine. Of these, the preferred N-formylated amine is dimethylformamide.

Alternatively a thioformylated secondary amine may be used, for example dimethylthioformamide.

Acid halides suitable for formation of a Vilsmeier reagent include phosphorus oxychloride, phosgene, phosphorus oxybromide, phosphorus pentachloride, thionyl chloride and oxalyl chloride. The halide of choice is phosgene.

The Vilsmeier reaction is preferably effected in a chlorinated hydrocarbon solvent such as 1,2-dichloroethane, preferably at a temperature of from $-10°$ to $+10°$ C.

The reducing agent of the borohydride type is preferably the borohydride of sodium, potassium, lithium, calcium or zinc; diborane; mono- and di-alkyl derivatives of borane and their complexes with bases such as pyridine; lithium cyanoborohydride; lithium or sodium alkoxy borohydrides. An alkali metal borohydride is preferred.

The treatment with the reducing agent is conveniently effected in an ether solvent such as tetrahydrofuran.

The 3,5-dien-3-enol ether can be prepared from the corresponding 4-en-3-one by enol etherification, for example by treatment with an orthoformate, e.g. triethyl orthoformate under acid conditions.

In general 3,5-dienol ethers of the compounds of Formula I may be prepared by reaction of the 3-one with enol etherifying reagents such as trialkyl orthoformates in the presence of an acid catalyst, for example a hydrocarbon-sulphonic acid, sulphosalicylic acid or more preferably, sulphuric acid.

3,5-dienol esters according to the invention may be prepared by reacting the 3-ones with an enol-esterifying reagent such as an isopropenyl acylate, e.g. isopropenyl acetate or an acyl anhydride under acid conditions, for example in the presence of p-toluene sulphonic acid or sulphosalicyclic acid.

According to a still further feature of the invention we provide pharmaceutical compositions comprising one or more steroids of the general Formula I as above defined together with a pharmaceutical carrier or excipient and/or one or more further active compounds e.g. hormones. Compounds having progestational activity may advantageously be formulated in conjunction with one or more hormones having oestrogenic activity.

The compositions according to the invention are intended for administration to both humans and animals The term "pharmaceutical" as used herein to describe compositions and carriers means therefore that these are of use in both human and veterinary medicine.

The compositions are preferably in the form of dosage units and may be formulated for daily oral administration in such forms as tablets, capsules, sachets, etc., either for taking directly or with a draught. Suppositories for rectal absorption may also be employed. Injection preparations may be formulated, preferably for more prolonged action, while implantation pellets may be formulated having the advantage of requiring very infrequent administration.

Conventional pharmaceutical excipients for solid preparations may for instance include sugar alcohols, sugars, starch, magnesium stearate, gelatine, polyethylene glycols and suitable colouring agents. Tablets may be coated for protection, colour distinction or elegance by conventional methods such as film coating or sugar or pearl coating. Suppositories may be prepared, using conventional bases such as glyco-gelatin, cocoabutter, or water-dispersible bases with a melting point above body temperature, such as polyglycols.

For injection purposes, preparation for intramuscular or subcutaneous administration may be prapared in conventional sterile oily, aqueous or emulsion bases, in solution and/or suspension. Vehicles preferably include physiologically acceptable vegetable oils, e.g. arachis oil, fractionated coconut oil; oily esters, e.g. isopropyl-myristate; non-aqueous solvents, e.g. propylene glycol; aqueous vehicles such as sterile water or physiological saline; together with suitable formulatory agents such as suspending agents, e.g. "Tween" 81, buffering agents for pH control, anti-oxidants, stabilising and solubilising agents. The injections may be formulated for immediate use, or as a dry powder for re-constitution before use with a separate vehicle. Unit injections required for prolonged action, e.g. 1 month's duration, would naturally contain an increased quantity of active material.

Each dosage unit for daily administration to humans preferably contains 0.01 to 5.0 mg. active material according to the invention, advantageously 0.05 to 5.0, e.g. 0.05 to 2.0 mg.

Implantation pellets would in general contain a much higher dosage to cover prolonged activity for preferably several months. Implants may be prepared aseptically from sterile material, for example by fusion or heavy compression.

For veterinary use in particular, long acting vaginal inserts such as tampons and pessaries may be prepared in a conventional manner. The dosage required for animal treatment will of course, vary according to the size of the animal.

The progestational compounds may be employed as oral contraceptives, preferably either in continuous daily doses of 0.01 to 0.5 mg. advantageously 0.05 to 0.5 mg. or given intermittently at higher doses mixed with an oestrogen (0.05 mg. ethynyl oestradiol plus 0.1–5 mg. advantageously 0.5 to 2.0 mg. progestagen). Apart from their use as oral contraceptives these progestagens may be employed clinically in the following conditions; dysmenorrhoea, functional uterine bleeding, pre-menstrual tension, diagnosis of pregnancy, endometriosis and threatened or habitual abortion.

For the better understanding of the invention the following examples are given by way of illustration only:

EXAMPLE 1

11α,17α-dihydroxy-21-iodo-19-norpregn-4-ene-3,20-dione

A mixture of 11α,17α - dihydroxy-19-norpregn-4-ene-3,20-dione (1 g., 3 mmole), calcium oxide (3 g.), calcium hydroxide (3 g.), azobis-iso-butyronitrile (0.1 g.), dry methylene chloride (15 ml.) and dry methanol (15 ml.) was vigorously stirred at room temperature. Iodine (0.9 g., 3.6 mmole) was added and stirring was continued for 1 hour by which time the brown colour had been discharged. The reaction mixture was filtered and the filtrate was partitioned between methylene chloride and water. The organic layer was separated, dried (MgSO$_4$) and evaporated under reduced pressure. Purification by preparative layer chromatography and crystallisation of the less polar fraction (0.71 g.) from methyl acetate/petroleum ether (B.P. 60–80°) gave the title compound, (0.464 g., 34%) M.P. 126° (decomp.), $[\alpha]_D$ +34° (c. 0.8, $CHCl_3$), $\lambda_{max}$ 329 nm., ($\epsilon$ 16,800).

EXAMPLE 2

21-fluoro-11α,17α-dihydroxy-19-norpregn-4-ene-3,20-dione

A solution of 11α,7α-dihydroxy-21-iodo-19-norpregn-4-ene-3,20-dione (2.87 g.) in acetonitrile (500 ml.) and water (5 ml.) was treated with silver fluoride (20 ml., 50% aqueous solution) at 40° for 4 hours. The reaction mixture was then filtered and the filtrate was concentrated and partitioned between methylene chloride and water. The organic layer was dried ($MgSO_4$) and evaporated in vacuo. The residue (2.04 g.) was purified by preparative layer chromatography and crystallisation from methyl acetate/petroleum ether (B.P. 60–80°) to give the title compound (0.72 g., 33%), M.P. 223–225°, $[\alpha]_D$ +10.6° (c. 0.5, $CHCl_3$), $\lambda_{max}$ 239.5 nm., ($\epsilon$ 16,000).

EXAMPLE 3

11β-chloro-21-fluoro-17α-hydroxy-19-norpregn-4-ene-3,20-dione

A mixture of 21-fluoro-11α,17α-dihydroxy-19-norpregn-4-ene-3,20-dione (0.35 g., 1 mmole), lithium chloride (0.35 g.) and dry tetrahydrofuran (7 ml.) was treated with N-(2-chloro-1,1-trifluoroethyl)-diethylamine (0.35 ml.). The mixture was stirred for 1½ hr. and then poured into iced water. The solid was collected by filtration and recrystallised twice from ethyl acetate to give the title compound (0.09 g. 22%) M.P. 196–197° (decomp.), $[\alpha]_D$ +129.5° (c. 0.5, dioxan), $\lambda_{max}$ 238 nm., ($\epsilon$ 16,800).

EXAMPLE 4

17α-acetoxy-11β-chloro-21-fluoro-19-norpregn-4-ene-3,20-dione

A solution of 11β - chloro-21-fluoro-17α-hydroxy-19-norpregn-4-ene-3,20-dione (0.66 g.) in glacial acetic acid (7 ml.) and trifluoroacetic anhydride (1.5 ml.) was heated under nitrogen at 80° for 1½ hr. The reaction mixture was cooled and poured into water. The solid (0.61 g.) was collected by filtration and purified by preparative layer chromatography and crystallisation from methyl acetate/petroleum ether (B.P. 60–80°) to give the title compound (0.066 g., 9%), M.P. 189°, $[\alpha]_D$ +62.5° (c. 0.25, $CHCl_3$), $\lambda_{max}$ 237.5 nm. ($\epsilon$ 18,800).

EXAMPLE 5

21-chloro-11α,17α-dihydroxy-19-norpregn-4-ene-3,20-dione

11α,17α-dihydroxy - 21 - iodo-19-norpregn-4-ene-3,20-dione (0.38 g.), lithium chloride (0.5 g.) and dry acetone (8 ml.) were heated under reflux for 3 hours. The reaction mixture was then evaporated to dryness and the residue was partitioned between methylene chloride and water. The organic layer was dried ($MgSO_4$) and evaporated. The residue (0.33 g.) was purified by preparative layer chromatography and crystallisation from methyl acetate/petroleum ether (B.P. 60–80°) to give the title compound (0.1 g.) M.P. 150° (decomp.), $[\alpha]_D$ +38.7° (c. 0.4, $CHCl_3$), $\lambda_{max}$ 241 nm., ($\epsilon$ 16,200).

EXAMPLE 6

11β,21-dichloro-17α-hydroxy-19-norpregn-4-ene-3,20-dione

A mixture of 21-chloro-11α,17α-dihydroxy-19-norpregn-4-ene-3,20-dione (0.28 g.), lithium chloride (0.3 g.), N-(2-chloro-1,1,2-trifluoroethyl) - diethylamine (6 ml.) was stirred for 1 hour and then poured into iced water. The solid (0.28 g.) was collected by filtration. Purification by preparative layer chromatography and crystallisation from methyl acetate/petroleum ether (B.P. 60–80°) gave the title compound (0.105 g.), M.P. 183° (decomp.), $[\alpha]_D$ +163° (c. 0.4 $CHCl_3$), $\lambda_{max}$ 239 nm. ($\epsilon$ 17,600).

EXAMPLE 7

17α-acetoxy-11β,21-dichloro-19-norpregn-4-ene-3,20-dione

A solution of 11β,21-dichloro-17α-hydroxy-19-norpregn-4-ene-3,20-dione (0.63 g.) in glacial acetic acid (7 ml.) and trifluoroacetic anhydride (1.7 ml.) was heated at 80° for 15 hours and then poured into water. The solid was collected by filtration. Purification by preparative layer chromatography and crystallisation from methyl acetate/petroleum ether (B.P. 60–80°) gave the title compound (0.113 g.), M.P. 191°, $[\alpha]_D$ +86° (c. 0.5, $CHCl_3$), $\lambda_{max}$ 238 nm. ($\epsilon$ 17,200).

EXAMPLE 8(a)

11β-chloro-19-norpregna-4,16-diene-3,20-dione

A solution of 11β-chloro-17α-hydroxy-19-norpregn-4-ene-3,20-dione (0.8 g.) and semicarbazide hydrochloride (0.8 g.) in methanol (40 ml.) was heated under reflux for 2 hrs. The solution was then concentrated by evaporation under reduced pressure and diluted with water. The solid was collected by filtration. A solution of this solid, pyruvic acid (2.5 ml.), water (5 ml.) and acetic acid (16 ml.) was heated on a steam bath for 1 hr.

The reaction mixture was then concentrated by evaporation under reduced pressure and partitioned between ethyl acetate and aqueous sodium hydrogen carbonate solution. The organic layer was washed with water, dried ($MgSO_4$) and evaporated under reduced pressure. The residue (0.67 g.) was separated by preparative thin-layer chromatography into two fractions. Crystallisation of the less polar fraction (0.38 g.) from methyl acetate/petroleum ether (B.P. 60–80°) gave 11β-chloro-19-norpregna-4,16-diene-3,20-dione (0.246 g., 32%), M.P. 183–184°, $[\alpha]_D$ +219° (c. 0.8 $CHCl_3$), $\lambda_{max}$ (EtOH) 237-8 nm. ($\epsilon$ 31,500).

EXAMPLE 8(b)

11β-chloro-16α-methylthio-19-norpregn-4-ene-3,20-dione

A solution of 11β-chloro-19-norpregna-4,16-diene-3,20-dione (0.6 g., 1.8 mmole) in glacial acetic acid (30 ml.) was chilled and concentrated hydrochloric acid (1.2 ml.) was added. To this solution was added methyl mercaptan (1.1 ml.) and the flask containing the mixture was stoppered and stored at 5–7° for 40 hrs. It was then concentrated in vacuo and the residue extracted with methylene chloride washed with aqueous sodium bicarbonate and water, dried ($MgSO_4$), and evaporated to a foam (1 g.). Purification by preparative layer chromatography and crystallization from methyl acetate/petroleum ether (B.P. 60–80°) gave the title compound (0.248 g., 36%), M.P. 194–195°, $[\alpha]_D$ +128° (c. 1.0 chloroform) $\lambda_{max}$ 236–7 nm. ($\epsilon$ 17,800).

EXAMPLE 9

11β-chloro-17α-methoxy-19-norpregn-4-ene-3,20-dione

11β - chloro - 17α - hydroxy-19-norpregn-4-ene-3,20-dione (0.2 g.) in methyl iodide (1 ml.) and dry dimethylformamide (2 ml.) was stirred with freshly prepared silver oxide (0.4 g.) for 2 days. The reaction mixture was filtered and the filtrate was partitioned between ether and water. The organic layer was dried ($MgSO_4$) and evaporated in vacuo. The residue (0.214 g.) was crystallised from methyl acetate/petroleum ether (B.P. 60–80°) to give the title compound. (0.096 g.), M.P. 163–165°, $[\alpha]_D$ +168° (c. 0.5 $CHCl_3$), $\lambda_{max}$ 237–9 nm. ($\epsilon$ 16,450).

EXAMPLE 10

17α-acetoxy-11β-chloro-3β-hydroxy-19-norpregn-5-en-20-one 3,17α - diacetoxy - 11β - chloro-19-norpregna-3,5-dien-20-one (1.0 g., 2.3 mmoles) in tetrahydrofuran (55 ml.) and ethanol (60 ml.) was stirred with sodium borohydride (1.00 g., 25.6 mmoles) in water (2 ml.). After 2 hrs. the solution was poured into ether, washed with dilute hydrochloric acid and with water, dried ($Na_2SO_4$) and evaporated. The residue (0.865 g.) was crystallised from ether/light petroleum to give the title compound (0.308 g.), M.P. 189–196°, $[\alpha]_D$ +24.7° (c. 0.71, dioxan).

EXAMPLE 11(a)

17α-acetoxy-11β-chloro-5α,6α-epoxy-19-norpregn-3β-ol-20-one

17α - acetoxy - 11β - chloro-3β-hydroxy-19-norpregn-5-en-20-one (0.801 g., 2.02 mmoles) in ethanol-free chloroform (20 ml.) was stirred with 90% m-chloroperbenzoic acid (0.466 g., 2.46 mmoles) in ethanol-free chloroform (10 ml.). After 2 hours the solution was poured into ether, washed with aqueous sodium bicarbonate and with water, dried ($Na_2SO_4$) and evaporated. Crystallisation from ether afforded the title compound (0.703 g., 82%) M.P. 198–200°, $[\alpha]_D$ —3.3° (c. 0.76, dioxan).

EXAMPLE 11(b)

17α-acetoxy-11β-chloro-6β-fluoro-19-norpregna-3β,5α-diol-20-one

17α - acetoxy - 11β - chloro-5α,6α-epoxy-19-norpregn-3β-ol-20-one (0.407 g., 0.99 mmole) in dry benzene (20 ml.) and dry ether (20 ml.) was treated with redistilled boron trifluoride etherate (0.4 ml.). The solution was stirred at room temperature for 2½ hours, and then poured into ethyl acetate and was washed with aqueous sodium bicarbonate and with water and then dried. Evaporation and purification of the residue (0.451 g.) by preparative layer chromatography and crystallization from acetone/ether gave the title compound (0.134 g.), M.P. 197–202°, $[\alpha]_D$ +13.5° (c. 1.04, dioxan).

EXAMPLE 11(c)

17α-acetoxy-11β-chloro-6β-fluoro-19-norpregn-5α-ol-3,20-dione

17α - acetoxy - 11β - chloro-6β-fluoro-19-norpregna-3β,5α-diol-20-one (0.26 g., 0.6 mmole) in acetone (20 ml.) at 0° was stirred and treated dropwise with Jones reagent (a solution containing chromium trioxide (66.6 g.) in concentrated sulphuric acid (53.3 ml.) and made up to 250 ml. with water) until oxidation was complete. The reaction mixture was poured into ether, washed with water, dried ($Na_2SO_4$) and evaporated in vacuo.

Crystallisation of the residue (0.198 g.) from ether gave the title compound. (0.129 g.), M.P. 169–175°, $[\alpha]_D$ +37° (c. 0.84 dioxan).

EXAMPLE 11(d)

17α-acetoxy-11β-chloro-6-fluoro-19-norpregna-4,6-diene-3,20-dione

17α - acetoxy - 11β - chloro-6β-fluoro-19-norpregn-5α-ol-3,20-dione (0.92 g., 2.14 mmoles) in dry acetic acid (35 ml.) was treated with hydrogen chloride. After 20 minutes the reaction mixture was poured into water and the product collected by filtration. The crude 17α-acetoxy-11β - chloro - 6β - fluoro-19-norpregn-5(10)-ene-3,20-dione (0.86 g.), was dissolved in dry dioxan (35 ml.) and triethyl orthoformate (5 ml.) and treated with concentrated sulphuric acid (0.2 ml.). After three hours the dark solution was poured into stirred dilute aqueous sodium hydroxide and the steroid was extracted with ether. The extract was washed with water, dried ($Na_2SO_4$) and evaporated.

Ethyl acetate (4 ml.) was added to the residue and the stirred solution was treated successively with activated manganese dioxide (5 g.) and 90% aqueous acetic acid (5 ml.). After an hour the reaction mixture was filtered, and the filtrate was evaporated to a gum. This was filtered through a column of Woelm neutral alumina (20 g.) in ethyl acetate. The eluate was evaporated and the residue (0.548 g.) was purified by preparative layer chromatography to give the title compound (0.132 g.), $[\alpha]_D$ +34.7°, (c. 0.95, dioxan), $\lambda_{max}$ 278 nm. ($\epsilon$ 20,100).

EXAMPLE 12

17α-acetoxy-11β-chloro-3-ethoxy-19-nor pregna-3,5-dien-20-one

17α - acetoxy-11β-chloro-19-norpregn-4-ene-3,20-dione (0.39 g. 1 mmole) in dry dioxan (5 ml.) and triethyl orthoformate (1 ml.) were stirred under nitrogen with sulphosalicylic acid (0.005 g.). After 45 minutes pyridine (0.5 ml.) and ether (200 ml.) were added. The solution was washed with aqueous sodium hydrogen carbonate and with water, dried ($Na_2SO_4$) and evaporated. The residue in ether was filtered through basic alumina (20 g.) and the filtrate was evaporated and the residue (0.28 g.) was crystallised from ether to give the ttile compound (0.063 g.), M.P. 146–148°, $[\alpha]_D$ +5.8° (c. 0.77, dioxan), $\lambda_{max}$ 241 nm. ($\epsilon$ 14,100).

EXAMPLE 13(a)

17α-acetoxy-11β-chloro-3-ethoxy-6-dimethylaminomethyl-19-norpregna-3,5-dien-20-one borane 17α - acetoxy - 11β-chloro-3-ethoxy-19-norpregna-3,5-dien-20-one (417 mg., 1 mmole) was dissolved in 1,2-dichloroethane (4 ml.) containing a drop of pyridine and added to an ice-cold, stirred Vilsmeier reagent prepared from dry dimethylformamide (0.3 ml.) in 1,2-dichloroethane (1 ml.) and 10% v./v. phosgene in 1,2-dichloroethane (5 ml.). The red mixture was stirred for two hours and then treated with a solution of lithium borohydride in dry tetrahydrofuran until the red colour was discharged. The mixture was partitioned between ether and aqueous sodium hydrogen carbonate solution, and the organic layer was washed with 1% aqueous succinic acid solution, dried ($Na_2SO_4$) and evaporated to give the title compound $\lambda_{max}$ 254 nm. ($\epsilon$ 14,600).

EXAMPLE 13(b)

17α-acetoxy-11β-chloro-6-methyl-17-norpregna-4,6-diene-3,20-dione

17α - acetoxy - 11β-chloro-3-ethoxy-6-dimethylaminomethyl-19-norpregna-3,5-dien-20-one borane (0.491 g.), sodium acetate (1.5 g.) and 5% palladium on charcoal (150 mg.) were refluxed with stirring with ethanol (10 ml.), cyclohexene (2 ml.) and acetic acid (0.5 ml.) After 90 minutes the reaction mixture was filtered, and the filtrate was partitioned between ether and aqueous sodium hydrogen carbonate solution.

The organic layer, to which one drop of pyridine was added, was evaporated to dryness. The residue (0.36 g.) in ethyl acetate (10 ml.) was added to stirred manganese dioxide and 90% aqueous acetic acid (1 ml.) was added. After 25 minutes the reaction mixture was filtered and the filtrate was evaporated to dryness. The residue (0.282 g.) was purified by preparative layer chromatography and crystallisation from methyl acetate/ether to give the ttile compound (0.136 g.) M.P. 190–194°, $[\alpha]_D$ +82.7° (c. 0.72 dioxan), $\lambda_{max}$ 282 nm. ($\epsilon$ 18,700).

EXAMPLE 14

11β-chloro-17α-formyloxy-19-norpregn-4-ene-3,20-dione

11β - chloro - 17α - hydroxy-19-norpregn-4-ene-3,20-dione (0.57 g.) in stirred 98–100% formic acid (20 ml.) at 10° was treated with phosphorus pentoxide (2.5 g.) over a period of 10 minutes. The mixture was stirred for a further 10 minutes, poured into water and extracted with ether. The organic layer was dried (MgSO$_4$) and evaporated in vacuo. The residue was purified by preparative layer chromatography and crystallisation from acetone/hexane to give the title compound (0.293 g.), M.P. 218–220°, (decomp.), [α]$_D$ +70° (c. 0.86, dioxan), λ$_{max}$ 237 nm (ε 17,900).

EXAMPLE 15(a)

6,11β-dichloro-19-norpregna-4,6,16-triene-3,20-dione

A solution of 6,11β-dichloro-17α-hydroxy-19-norpregna-4,6-diene-3,20-dione (0.38 g.3, 1 mmole; prepared by hydrolysis of the 17α-acetoxy group of 6,11β-dichloro-17α - acetoxy-19-norpregna-4,6-diene-3,20-dione with potassium bicarbonate in methanol) and semicarbazide hydrochloride (0.38 g.) in methanol (20 ml.) was heated under reflux for 2 hrs. The solution was then concentrated under reduced pressure and diluted with water. The solid was collected by filtration. A solution of this solid, pyruvic acid (0.4 ml.), water (2 ml.) and acetic acid (7 ml.) was heated on a steam bath for 1 hr. The reaction mixture was then concentrated by evaporation under reduced pressure and partitioned between ethyl acetate and sodium hydrogen carbonate solution. The organic layer was washed with water, dried (MgSO$_4$) and evaporated under reduced pressure. The residue (0.35 g.) was separated by preparative thin-layer chromatography into two fractions. Crystallisation of the less polar fractions (0.15 g.) from methyl acetate/petroleum ether (B.P. 60–80°) gave 6,11β - dichloro - 19-norpregna-4,6,16-triene-3,20-dione (0.12 g., 33%), M.P. 158–160°, [α]$_D$ +270° (c. 0.5 CHCl$_3$), λ$_{max}$ 238, 280 nm. (ε 13,700, 23,500).

EXAMPLE 15(b)

6,11β,16α-trichloro-19-norpregna-4,6-diene-3,20-dione

A chilled solution of 6,11β-dichloro-19-norpregna-4,6,16-triene-3,20-dione (0.4 g.) in dioxan (30 ml.) was saturated with hydrogen chloride and stored at 15° for 2 days. The reaction was then partitioned between methylene chloride and aqueous sodium hydrogen carbonate solution. The organic layer was dried (MgSO$_4$) and evaporated in vacuo. The residue (0.46 g.) was purified by preparative layer chromatography and crystallisation from acetate to give the title compound (0.204 g., 46.5%), M.P. 142–144° (decomp.), [α]$_D$+198° (c. 1.0, CHCl$_3$), λ$_{max}$ 281 nm. (ε 23,700).

EXAMPLE 16(a)

17α-acetoxy-6,11β-dichloro-19-norpregna-4,6-diene-3,20-dione

A mixture of 17α-acetoxy-6,11β-dichloro-3-ethoxy-19-norpregna-3,5-dien-20-one (0.6 g.), manganese dioxide (3 g.) and benzene (15 ml.) was stirred for 1 hr., and then filtered. The filtrate was evaporated under reduced pressure and the residue (0.528 g.) was purified by preparative thin-layer chromatography and crystallisation of part (0.448 g.) from methyl acetate/petroleum ether (B.P. 60–80°) gave the methyl acetate solvate which was desolvated by heating at 95° for 4 hrs. at 0.5 mm. to give 17α-acetoxy-6,11β-dichloro-19-norpregna-4,6-diene - 3,20-dione (0.37 g., 66%), M.P. 211–212° (decomp.), [α]$_D$ +78° (c. 1.0 dioxan), λ$_{max}$ (EtOH) 280 nm. (ε 22,100).

EXAMPLE 16(b)

6,11β-dichloro-17α-hydroxy - 19 - norpregna-4,6-diene-3,20-dione

17α-acetoxy-6,11β - dichloro - 19 - norpregna-4,6-diene-3,20-dione methyl acetate solvate (104 mg.) in methanol (5 ml.) and water (0.1 ml.) was treated with potassium bicarbonate (22 mg.) and the solution was refluxed for two hours in a stream of nitrogen. The solution was diluted with ether, washed with dilute aqueous hydrochloric acid and with water, dried (MgSO$_4$), filtered and evaporated to a foam which on recrystallisation from aqueous methanol afforded 6,11β-dichloro-17α-hydroxy-19-norpregna-4,6-diene-3,20-dione (34 mg.) as prisms, M.P. 215–218°, λ$_{max}$ 280.5 nm. (ε 22,100).

EXAMPLE 16(c)

6,11β-dichloro-17α-formyloxy-19-norpregna-4,6-diene-3,20-dione 6,11β-dichloro-17α-hydroxy - 19 - norpregna-4,6-diene-3,20-dione (0.375 g., 0.98 mmole) in rapidly stirred 98-100% formic acid (20 ml.) at 10° was treated with phosphorus pentoxide (2.5 g.) in small quantities over a period of 10 minutes. After a further 10 minutes the solution was poured into cold water (200 ml.) and the product was collected by filtration. Purification by preparative layer chromatography and crystallisation from methyl acetate/hexane afforded the title compound (0.170 g., 42%) M.P. 210–212° (decomp.), [α]$_D$ +97° (dioxan. c. 1.7), λ$_{max}$ 279 nm. (ε 23,000).

EXAMPLE 17

11β,16α-dichloro-19-norpregn-4-ene-3,20-dione

A chilled dioxan solution (75 ml.) containing 11β-chloro-19-norpregna-4,16-diene-3,20-dione (1 g., 0.003 mole) was saturated with hydrogen chloride. After 3 days at 15° the solution was poured into chilled aqueous sodium hydrogen carbonate solution and then extracted into chloroform. The organic layer was washed with water, dried (MgSO$_4$) and evaporated. The residue (1 g.) was purified by preparative layer chromatography and crystallisation from methyl acetate to give the title compound (0.279 g., 25%), M.P. 151.5–152.5°, [α]$_D$ +166° (CHCl$_3$ c. 1.0), λ$_{max}$ 236 nm. (ε 17,650).

EXAMPLE 18

11β-chloro-16α,17α-dihydroxy-19-norpregn-4-ene-3,20-dione

To a stirred, ice-cold solution of 11β-chloro-19-norpregna-4,16-diene-3,20-dione (0.20 g., 0.6 mmole) in acetone (5.7 ml.) and glacial acetic acid (0.057 ml.) was added a solution of potassium permanganate (92 mg.) in 85% aqueous acetone (5.3 ml.) over 15 minutes. Sulphur dioxide was then bubbled through the brown solution until it turned yellow. The mixture was filtered and the filtrate was concentrated by evaporation. The residue was partitioned between ethyl acetate and aqueous sodium hydrogen carbonate solution. The organic layer was washed with water, dried (MgSO$_4$) and evaporated. The residue was purified by preparative layer chromatography and crystallisation from acetone to give the title compound (22 mg. 10%), M.P. 176–180°.

EXAMPLE 19

11β-chloro-16α,17α-isopropylidenedioxy-19-norpregn-4-ene-3,20-dione

Crude 11β-chloro-16α,17α-dihydroxy - 19 - norpregn-4-ene-3,20-dione (0.557 g.) in hot acetone (30 ml.) was treated with concentrated hydrochloric acid (3 drops). The solution was boiled for 2 minutes and then left overnight. The reaction mixture was then partitioned between ethyl acetate and water. The organic layer was dried (MgSO$_4$) and evaporated. The residue (0.602 g.) was purified by preparative layer chromatography and crystallisation from methyl acetate to afford the title compound (0.213 g., 17.5%) M.P. 203–205°, [α]$_D$ +150° (c. 1.0, CHCl$_3$), λ$_{max}$ 236 nm. (ε 18,150).

EXAMPLE 20

11β-chloro-17α-hydroxy-21-iodo-19-norpregn-4-ene-3,20-dione

A mixture of 11β-chloro-17α-hydroxy-19-norpregn-4-ene-3,20-dione (1.4 g., 4 mmole), calcium oxide (4 g.), calcium hydroxide (4 g.), azobis-iso-butyronitrile (0.14 g.), dry methylene chloride (20 ml.) and dry methanol (23 ml.) was vigorously stirred at room temperature.

Iodine (1.2 g., 4.8 mmole) was added and stirring was continued for 30 minutes by which time the brown colour had been discharged. The reaction mixture was filtered and the filtrate was partitioned between methylene chloride and water. The organic layer was separated, dried (MgSO$_4$) and evaporated in vacuo. Purification of the residue (1.85 g.) by preparative layer chromatography and crystallisation of the less polar fraction from methyl acetate/petroleum ether (B.P. 60–80°) gave the title compound (0.264 g., 14%), M.P. 116° (decomp.), [α]$_D$ +110° (c. 0.8, CHCl$_3$), λ$_{max}$ 238 nm. (ε 21,000).

The following examples illustrate pharmaceutical compositions according to the invention:

(A) Oral tablets (continuous daily administration):

(a)

| | Mg. |
|---|---|
| 6,11β - dichloro-17α-formyloxy - 10 - norpregna-4,6-diene-3,20-dione (microfine) | 0.25 |
| Starch (60 mesh) | 10.0 |
| Lactose (60 mesh) | 64.0 |
| Magnesium stearate (100 mesh) | 0.75 |

Ball mill (a) with twice the weight of lactose to a very fine powder all below 5 microns. Dilute with 5 successive portions of lactose, milling between each. Triturate with the starch and blend in the remaining lactose to form a homogeneous powder. Granulate with 50% ethanol in water and pass through a No. 12 mesh B.S. sieve. Dry the granules to constant weight and pass through a No. 20 mesh B.S. sieve and blend in the magnesium stearate prior to compression at 75 mg. per tablet on 7/32 inch punches, preferably engraved punches for identification of the tablets. Pressure is adjusted so that the tablets disintegrate within 10 mins. The tablets may be film coated for colour distinction and should be released for public use, only in specially designed packs to strictly regulate the use of the tablets.

(B) Oral tablets (for intermittent administration):

(b)

| | Mg. |
|---|---|
| 11β-chloro - 16α,17α - idopropylidenedioxy - 19-norpregn-4-ene-3,20-dione (microfine) | 2.0 |

(c)

| | Mg. |
|---|---|
| Ethynyl oestradiol (microfine) | 0.05 |
| Starch (60 mesh) | 10.5 |
| Lactose (60 mesh) | 66.65 |
| Magnesium stearate (100 mesh) | 0.8 |

Ball mill (b) and (c) separately with very small quantities of lactose, mix together and proceed as in Example 1, treating the mixture of (b) and (c) as for (a) in Example 1. The tablets will of course be compressed on different punches at 80 mg. per tablet, and may be subsequently coated if required.

(C) Long acting injection (deep intra muscular):

(d)

| | Mg. |
|---|---|
| 6,11β,16α - trichloro - 19 - norpregna - 4,6 - diene-3,20-dione (Sterile) | 10.0 |
| Aluminum stearate 1.5% w./w. gelled in winterised arachis oil to produce 0.5 ml. | |

Prepare the base by heating together the aluminum stearate dispersed in the arachis oil until solution is effected and thickening occurs about 90° C. Close the vessel and with continued stirring, sterilise the base by heating at 150° C. for one hour. Cool rapidly to 55° C. Aseptically triturate the (d) with the base and pass through a refining mill and premix to obtain a homogeneous dispersion. Pack into unit cartridges.

(D) Aqueous injection (long acting):

(e)

| | Mg. |
|---|---|
| 11β,16α - dichloro - 19 - norpregn - 4 - ene - 3,20-dione | 10.0 |

(f)

| | Mg. |
|---|---|
| Sodium carboxy-methyl-cellulose | 10.0 |

(g)

Nonex 52 (a polyethylene glycol oleate supplied by Union Carbide of Graftone St., London W.1.), 0.01% w./v. (in final injection).

(h)

| | Mg. |
|---|---|
| Formalised starch | 20.0 |

Vehicle (in separate container):

| | Ml. |
|---|---|
| A sterile sorbitol solution 10% w./w. | 1 |

Sterilise (f) and (h) separately by dry heat. Dissolve (g) in a little chloroform, sterilise by filtration and disperse over the mixed, sterilised powders (f) and (h). Remove the chloroform and blend the powders in a ball mill to give a homogeneous mix. Prepare sterile crystals of (e) in 2 particle size ranges, approximately 15–25 microns and 30–40 microns, taking about equal portions of each. Blend these crystals with the base and aseptically distribute 55 mgs. of the resultant dry mix into sterile vials and close hermetically. Reconstitute the injection immediately before use, by adding 1 ml. of the sorbitol vehicle to the dry mix and shaking to obtain a suspension.

(E) Tablet implant:

(j)

| | Mg. |
|---|---|
| 11β - chloro - 16α,17α - isopropylidene-dioxy - 19-norpregn-4-ene-3,20-dione (microfine) | 60 |

Tablet implants may be prepared by conventional methods such as heavy compression of the pure sterile material or by fusion, by melting and casting into shape in a mould. The implants are packed into sterile moisture proof containers. The quantity of active ingredient in an implant will be related to the duration required; shape and surface area and average absorption required from the formulation.

(F) Intravaginal pessary for veterinary use (for sheep):

(k)

| | Mgs. |
|---|---|
| 6,11β - dichloro - 17α - formyloxy - 19 - norpregna-4,6-diene-3,20-dione | 20.0 |

Dissolve (k) is sufficient ethanol and sterilise by filtration. The pessaries or tampons may be prepared in a conventional manner by absorbing the required amount of ethanolic solution onto sterile gauze rolls or fine porous plastic sponges, evaporating the ethanol under vacuum and protecting the vaginal insert in a sterile pack, suitable for administration. The dosage required for veterinary preparations, will, of course, be related to the size of the animal being treated.

We claim:

1. A steroid of the general formula

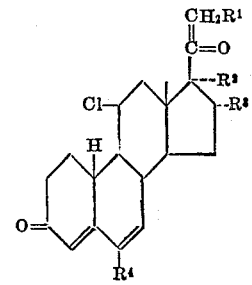

wherein:
R$^1$ is a hydrogen or halogen atom,
R$^2$ is a hydrogen atom, a hydroxy group, an alkoxy group having 1 to 6 carbon atoms or a carboxylic acyloxy group having 1 to 6 carbon atoms,
R$^3$ is a hydrogen atom, a halogen atom, to together with R² forms an alkylidenedioxy group having up to 4 carbon atoms;

R⁴ is a hydrogen atom, fluorine atom, chlorine atom or a methyl group; provided that R¹ is only a hydrogen atom when R² is a formyloxy or alkoxy group, or R³ is a halogen atom, or R² and R³ together form an alkylidenedioxy group having up to 4 carbon atoms, or when R⁴ is a fluorine atom or a methyl group; and the 3,5-dienol methyl and ethyl ethers and acetic, propionic, benzoic, valeric and hexahydrobenzoic esters thereof.

2. The steroid of claim 1 wherein
R¹ is a hydrogen or halogen atom,
R² is a hydrogen atom, a hydroxy group or a carboxylic acyloxy group having 1 to 6 carbon atoms,
R³ is a hydrogen atom, a halogen atom, or together R² forms an alkylidenedioxy group having up to 4 carbon atoms;
R⁴ is hydrogen atom, a chlorine atom or a methyl group; provided that R¹ is only a hydrogen atom when R² is a formyloxy group, or R³ is a halogen atom, or R² and R³ together form an alkylidenedioxy group having up to 4 carbon atoms, or when R⁴ is a methyl group; and the 3,5-dienol methyl and ethyl ethyl ethers and acetic, propionic, benzoic, valeric and hexahydrobenzoic esters thereof.

3. The steroid of claim 1 wherein
R¹ is a fluorine, chlorine, or iodine atom,
R² is a formyloxy, acetoxy, propionyloxy, butyryloxy, valeryloxy, or caproxyloxy group,
R³ is a chlorine atom, or
R² and R³ together form an isopropylidenedioxy or isobutylidenedioxy group, and
R⁴ is a chlorine atom.

4. The steroid of claim 1 wherein R⁴ is a fluorine atom, a chlorine atom or a methyl group, and a double bond is present in the 6,7-position.

5. The steroid of claim 1 which is 6,11β-dichloro-17α-formyloxy-19-norpregn-4,6-diene-3,20 dione;

6. The steroid of claim 1 which is 11β,16α-dichloro-19-norpregn-4-ene-3,20-dione.

7. The steroid of claim 1 which is 11β-chloro-16α,17α-isopropylidenedioxy-19-norpregn-4-ene-3,20-dione.

8. The steroid of claim 1 which is 11β-chloro-17α-formyloxy-19-norpregn-4-ene-3,20-dione.

9. The steroid of claim 1 which is 17α-acetoxy-11β-chloro-6-fluoro-19-norpregna-4,6-diene-3,20-dione.

10. The steroid of claim 1 which is 17α-acetoxy-11β-chloro-6-methyl-19-norpregna-4,6-diene-3,20-dione.

11. The steroid of claim 1 which is 17α-acetoxy-11β-chloro-21-fluoro-19-norpregn-4-ene-3,20-dione.

12. The steroid of claim 1 which is 6,11β,16α-trichloro-19-norpregna-4,6-diene-3,20-dione.

13. The steroid of claim 1 which is 17α-acetoxy-11β,21-dichloro-19-norpregn-4-ene-3,20-dione 14. The steroid of claim 1 which is 11β-chloro-16α-methylthio-19-norpregn-4-ene-3,20-dione.

15. The steroid of claim 1 which is 11β-chloro-17α methoxy-19-norpregn-4-ene-3,20-dione.

16. A steroid selected from the group consisting of
17α-acetoxy-11β-chloro-3β-hydroxy-19-norpregn-5-en-20-one,
17α-acetoxy-11β-chloro-5,6α-epoxy-19-norpregn-3β-ol-20-one,
17α-acetoxy-11β-chloro-6β-fluoro-19-norpregna-3β,5α-diol-20-one,
17α-acetoxy-11β-chloro-6β-fluoro-19-norpregn-5α,-ol-3,20-dione,
17α-acetoxy-11β-chloro-3-ethoxy-6-dimethylaminomethyl-19-norpregna-3,5-dien-20-one borane, and
11β-chloro-16α,17α-dihydroxy-19-norpregn-4-ene-3,20-dione.

17. A steroid of the general formula

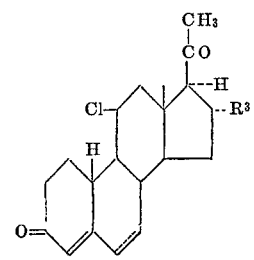

wherein:
R³ is an alkylthio group having 1 to 6 carbon atoms; and the 3,5-dienol methyl and ethyl ethers and acetic, propionic, benzoic, valeric, and hexahydrobenzoic esters thereof.

References Cited
UNITED STATES PATENTS
3,463,793    8/1969    Herzog et al. _____ 260—349

ELBERT L. ROBERTS, Primary Examiner

U.S. Cl. X.R.

260—397.3; 397.45, 243